United States Patent
Schapiro et al.

(10) Patent No.: US 6,910,397 B2
(45) Date of Patent: Jun. 28, 2005

(54) TOOTHING ASSEMBLY

(76) Inventors: Boris Schapiro, Schlossstrasse 30, D-12163 Berlin (DE); Naum Kruk, Blohmstrasse 33, D-12307 Berlin (DE); Lev Levitin, 11 Monmouth Ct., Apt. 1, Brookline, MA (US) 02446

( * ) Notice: Subject to any disclaimer, the term of this patent is extended or adjusted under 35 U.S.C. 154(b) by 0 days.

(21) Appl. No.: 10/773,086

(22) Filed: Feb. 5, 2004

(65) Prior Publication Data

US 2004/0221667 A1 Nov. 11, 2004

Related U.S. Application Data

(63) Continuation of application No. PCT/EP02/08897, filed on Aug. 8, 2002.

(30) Foreign Application Priority Data

Aug. 9, 2001 (DE) .......................... 101 39 285

(51) Int. Cl.[7] .............................. F16H 27/02
(52) U.S. Cl. .................. 74/89.18; 74/89.12; 74/89.17; 74/109; 74/120

(58) Field of Search ............................ 74/89.18, 89.17, 74/89.12, 109, 120

(56) References Cited

U.S. PATENT DOCUMENTS

| | | | | |
|---|---|---|---|---|
| 4,279,553 A | * | 7/1981 | Cleary | 408/135 |
| 4,393,907 A | * | 7/1983 | Kronstadt | 192/99 S |
| 4,495,827 A | * | 1/1985 | Parizet | 74/89.18 |
| 4,799,468 A | * | 1/1989 | Farquhar | 123/400 |
| 5,582,067 A | * | 12/1996 | Snider | 74/109 |
| 2004/0221667 A1 | * | 11/2004 | Schapiro et al. | 74/89.18 |

* cited by examiner

Primary Examiner—David M. Fenstermacher
(74) Attorney, Agent, or Firm—Lawrence G. Fridman

(57) ABSTRACT

The axis of a gear is to follow a trajectory having a salient point. To this end, the gear rolls along two stationary toothed racks. A change-over toothing is provided between these two toothed racks. This change-over toothing extends non-smoothly with respect to the toothed racks. Such change-over toothing permits the gear to roll, without jamming, from one of the toothed racks to the other one, with its axis following a trajectory having a salient point.

8 Claims, 3 Drawing Sheets

TOOTHING ASSEMBLY

This application is a continuation of International Application PCT/EP02/08897, filed Aug. 8, 2002 which claims priority of German patent application S.N. 101 39 285.0 filed Aug. 9, 2001.

TECHNICAL FIELD

The invention relates to a toothing assembly comprising a stationary toothing structure and a gear rolling along the stationary toothing structure. The stationary toothing structure has two toothed racks, the gear, during its rolling motion, passing from one toothed rack to the other one.

PRIOR ART

In many design tasks, the problem arises of moving the axis of a gear rolling along a toothed rack, or a constructional element connected thereto, along a trajectory having one or more salient points. Though the trajectory is continuous in the salient points, there is, however, a tangent discontinuity. An example of such a trajectory is a twoangle formed by two oppositely curved circle arcs.

Such a problem occurs, for example, with a rotary piston engine as described in document DE 199 20 289 C1. There, a rotary piston, the cross section of which is an oval of second order, is movable in a chamber, the cross section of which forms an oval of third order. A driven shaft extending centrally through the chamber serves to pick-off the motion of the rotary piston. The driven shaft extends through an oval aperture through the rotary piston and carries a pinion. The pinion engages a toothing on the inner side of the aperture. The axis of the driven shaft and, thereby, of the pinion moves, during the motions of the rotary piston, along a trajectory relative to the rotary piston, which trajectory has the shape of a twoangle. There are problems to design the toothing in such a way that the pinion does not jam in the points, where the axis of the pinion passes through the salient points of the trajectory.

The problem of moving a gear along a toothing in such a way that its axis moves through a trajectory having salient points, has not been solved up to now.

In the book by I. I. Artobolevskij "Mechanisms in modem technology", Vol III, publisher Nauka, Moskow 1973, solutions are described, wherein attempts are made to evade the described problem. To this end, the critical locations with the tangent discontinuity are replaced by continuous and smooth stretches of toothing. Another attempt consisted in interrupting the rolling at the critical locations. Also gears, which have no rotational symmetry or other mechanisms have been used, which are specially adapted to the particular case.

DISCLOSURE OF THE INVENTION

It is the object of the invention to provide a toothing assembly of the present type, wherein the axis of a gear rolling along the toothed racks can move without jamming through a trajectory having a salient point.

This object is achieved in that a change-over toothing is provided between the toothed racks which extends non-smoothly with respect to the toothed racks to generate a trajectory of the axis of the rolling gear, which trajectory has a discontinuity of the tangent in a salient point.

Then the gear, at first, rolls along one of the toothed racks. Its axis moves along one leg of the trajectory up to the salient point. From here, the gear would have to roll along the other toothed rack, such that the axis of the gear is moved through the salient point along the other leg of the trajectory. The transition from one toothed rack to the other one has to occur, on one hand, instantaneously. On the other hand, there must be no jamming. Such jamming occurs, if the toothing in the region of the salient point is smoothly continuous. If the radius of curvature of the reference circle of the "change-over toothing" between the toothed racks is smaller than the radius of the gear, then the gear will not be able to roll over this change-over toothing and will jam. If the radius of curvature of the reference circle of the change-over toothing is larger than the radius of the gear, then there will be no instantaneous transition from one toothed rack to the other one. The axis of the gear moves, during the rolling along the change-over toothing, along a circular arc. No salient point will be generated. If the reference circles of the change-over toothing and of the gear are equal, with smooth connection, then the gear is not able to roll on in the region of the change-over toothing. Therefore, the invention provides for a non-smooth transition between the toothed racks and the change-over toothing. Then provision can be made that the gear, immediately after disengaging one toothed rack, will again get into mesh with the other toothed rack. The change-over toothing, which joins the racks non-smoothly and preferably is arranged to form gaps therebetween, ensures that always mesh between rolling on gear and stationary toothed rack is provided. At first, the gear meshes with one of the toothed racks and with the change-over toothing. In the next moment, the gear meshes with the change-over toothing and the other toothed rack. Thus, while continuously maintaining the engagement, an instantaneous transition from one toothed rach to the other one takes place. The trajectory has a salient point.

A relief is formed between the two toothed racks, which prevents simultaneous contact of the gear with the two toothed racks. The change-over toothing may be formed by a toothed arc convex towards the rolling gear. In this case, preferably the gear has a reference circle which has common tangents with each of the reference curves of the two toothed racks, when the axis of the gear is in the salient point of the trajectory, and the convex toothed arc has a reference circle which has a common tangent with the reference circle of the gear. The change-over toothing may, however, also be a linear toothed rack. A linear toothed rack may be regarded as a convex toothed rack having a radius of curvature of infinity. The gear, while meshing with the change-over toothing, leaves engagement with one toothed rack immediately before it engages the other toothed rack. The reference curves of the two toothed racks may be concave-arcuate.

Embodiments of the invention are described in greater detail hereinbelow with reference to the accompanying drawings.

PREFERRED EMBODIMENT OF THE INVENTION

Figure 1:
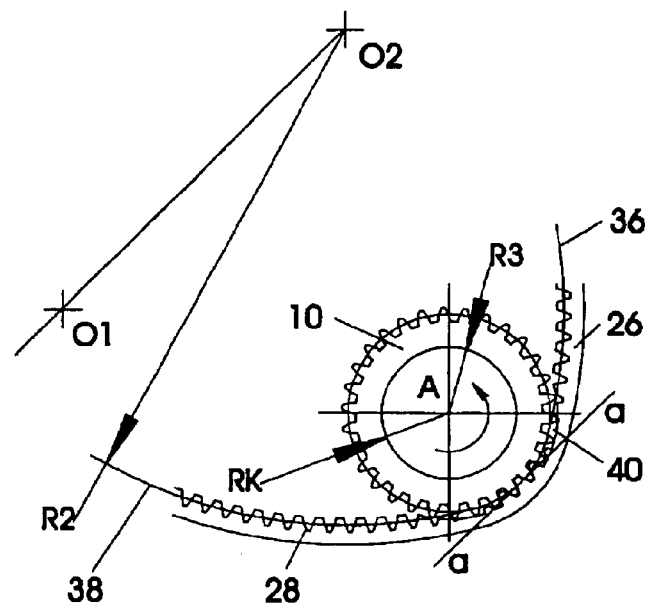
FIG. 1 shows a gear, when changing-over from engagement with a first arcuate toothed rack to engagement with a second arcuate toothed rack, the gear meshing with a change-over toothing and meshing with just no longer with the first toothed rack and meshing just not yet with the second toothed rack.

In the following, the invention will be described with reference to a singular trajectory with circular paths in the immediate neighbourhood of the salient point. Of course, the validity of the invention is not limited thereto.

In the Figures, numeral 10 designates a gear. The gear 10 is to roll along a toothing, which is generally designated by numeral 12, in such a way that its axis A follows a singular trajectory 14. The trajectory consists of two circular arcs 16 and 18, which define a salient point 20. The circular arc 16 is curved about a centre of curvature 22. The circular arc 18 is curved about a centre 24.

Figure 5:
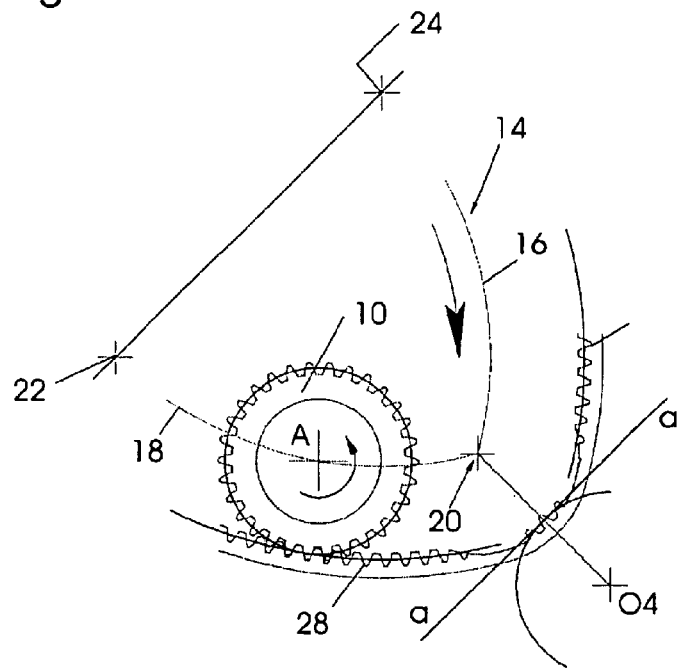
FIG. 5 shows a toothing assembly with a convex change-over toothing and the trajectory followed by the axis of the gear and having a salient point.

To this end, the toothings 12 have two concave toothed racks 26 and 28. The toothed rack 26 is curved about the centre of curvature 22. Its reference circle is larger, by the reference circle radius of the gear 10, than radius of curvature of the circular arc 16. The toothed rack 28 is curved about the centre of curvature 24. Its reference radius is larger, by the reference radius of the gear 10, than the radius of curvature of the circular arc 18. When the gear 10 rolls along the toothed rack 26, then the axis A of the gear follows the circular arc 16 up to the salient point 20. When the gear 10 rolls along the circular arc 18, then the axis A of the gear follows the circular arc 18 from the salient point 20 to the left in FIG. 5.

The problem is the change-over from the toothed rack 26 to the toothed rack 28.

Figure 2:
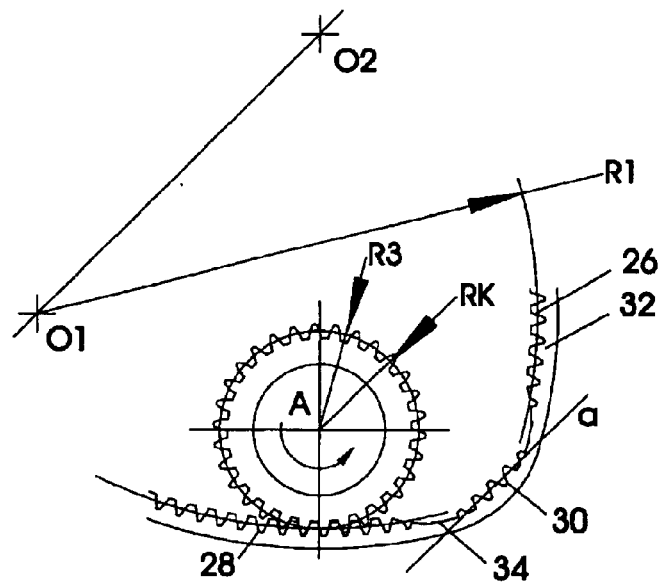
FIG. 2 shows the toothing assembly of FIG. 1, after the gear has moved further to engage the second toothed rack.

As illustrated in FIGS. 1 and 2, there is a relief between the ends of the toothes racks 26 and 28. A linear "change-over toothing" 30 is located in this relief. A relief 32 is provided between the toothed rack 26 and the linear change-over toothing 30. Similarly a relief 34 is provided between the toothed rack 28 and the linear change-over toothing 30.

As can be seen from FIG. 1, the reference circles 36 and 38 of the toothed racks 26 and 28, in the position corresponding to the salient point, smoothly join the reference circle 40 of the gear 10. The toothing between the toothed racks 26 and 28, however, do not follow this reference circle 40 but form, as described, a linear toothed rack or change-over toothing 30. The reference line a—a of this linear change-over toothing 30 corresponds to the tangent at the reference circle of the gear 10.

Figure 3:
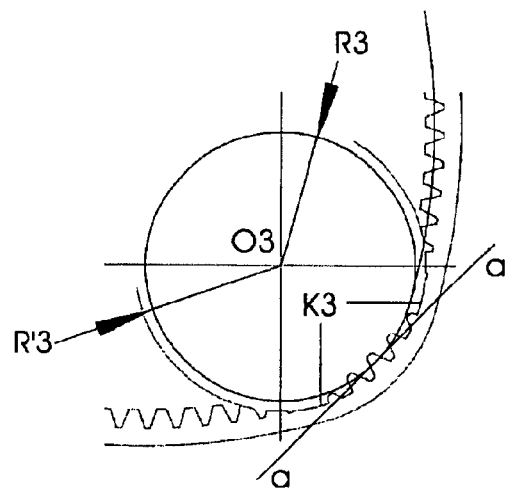
FIG. 3 shows, at an enlarged scale, a linear change-over toothing with the ends of the toothed racks.

It can be seen from FIG. 1, that the gear, in its "salient point" position, meshes, in its central region, with the change-over toothing 30. The gear 10 just no longer engages the toothed rack 26. The gear just not yet engages the toothed rack 28. Immediately previously there was still engagement with the toothed rack 26, immediately thereafter the gear 10 will engage the toothed rack 28. Thus a instantaneous change-over from the toothed rack 26 to the toothed rack 28 takes place. The trajectory 14 of the axis A has a genuine salient point with a tangent discontinuity. As the change-over toothing 30 is linear, thus is not "bent" around the gear 10, there will be no jamming. FIG. 3 is an enlarged illustration and permits more clearly the recognition of the deviation of the change-over toothing 30 from the reference circle of the gear 10.

Therefore, the described toothing assembly permits jamming-free and instantaneous change-over of the gear 10 from one toothed rack 26 to the other toothed rack 28 such that the axis A follows a trajectory 14 exhibiting a salient point 20. During this change-over, however, driving connection between gear 10 and toothing and the transmission of torques is ensured, at each moment, through meshing toothings.

Figure 4:
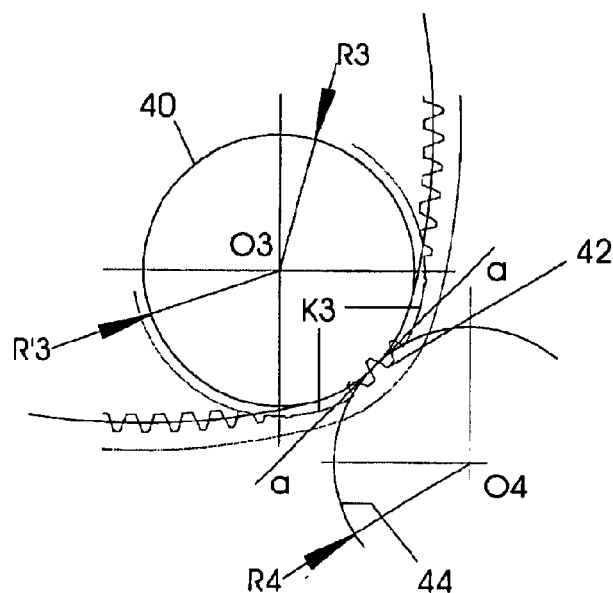
FIG. 4 shows a convex change-over toothing in similar representation as FIG. 3.

FIG. 4 shows a toothing assembly similar to FIGS. 1 to 3. Corresponding elements are designated by the same reference numerals as there. In the toothing assembly of FIG. 4, a convex change-over toothing 42 is provided instead of a linear change-over toothing. The change-over toothing 42 has a reference circle 44. The reference circle 40 of the gear 10, in the "salient point" position thereof, has a common tangent a—a with the reference circle. Preferably, the tangent a—a is parallel to the connection line between the centres of curvature 22 and 24.

In an extreme case, it is possible that the change-over toothing consists of one single tooth. It may also be possible that the change-over toothing is concave, if it has a sufficiently large radius of curvature.

The "physics" of the guidance of the axis of a rolling gear about the salient point 20 of the trajectory is substantially determined by the fact that the trajectory of the axis or of the centre of gravity of the gear remains continuous in the salient point 20, while its velocity changes its direction discontinuously.

Figure 6:
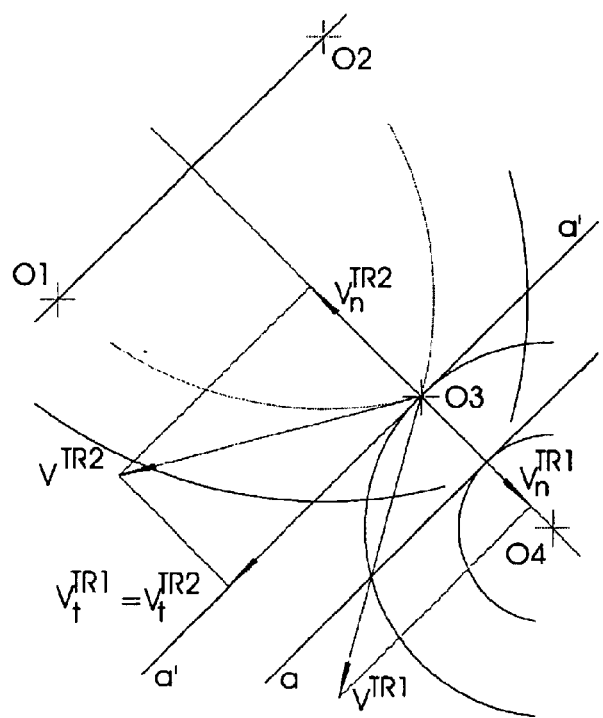
FIG. 6 is a vector diagram for the speed of the axis of the gear, when passing the salient point of the trajectory.

This situation is illustrated in FIG. 6.

If frictional losses and other dynamic effects are neglected, the velocity of the axis A immediately in front of the salient point, namely $V^{TR1}$, jumps to the speed of the axis immediately behind the salient point $V^{TR2}$. The component of the velocity parallel to the line a—a prior to the jump $V_i^{TR1}$ is equal to the component immediately behind the salient point $V_i^{TR2}$. The component of the velocity normal to the line a—a prior to the jump $V_n^{TR1}$ varies discontinuously to the opposite component immediately behind the salient point $V_n^{TR2}$. It is $$V_n^{TR1} = -V_n^{TR2}.$$

Thereby, passing of the axis A of the gear 10 through the salient point is equivalent to a mirror reflection of the mass centre of gravity at the line a—a.

We claim:

1. A toothing assembly comprising toothing means having two toothed rack means and a gear defining an axis and arranged to roll along said stationary toothing means and to pass, during its rolling motion, from one of said toothed rack means to the other one, wherein a change-over toothing means is provided between said toothed rack means, said change-over toothing means extending non-smoothly with respect to said toothed rack means to generate a trajectory of the axis of said rolling gear relative to said toothing means, said trajectory having a discontinuity of its tangent in a salient point.

2. A toothing assembly as claimed in claim 1, wherein a relief is provided between said two toothed rack means to prevent simultaneous contact of said gear with said two toothed rack means.

3. A toothing assembly as claimed in claim 2, wherein said change-over toothing means is a toothed arc convex towards said gear.

4. A toothing assembly as claimed in claim 3, wherein
said gear defines a notional reference circle an said two toothed rack means define notional reference curves, said notional reference circle having common tangents with each of said reference curves of said two toothed rack means, when said axis defined by said gear is in said salient point of said trajectory, and said convex toothed arc defines a further reference circle, said further reference circle having a tangent in common with the reference circle of said gear.

5. A toothing assembly as claimed in claim 2, wherein said change-over toothing means is a linear toothed rack.

6. A toothing assembly as claimed in claim 2, wherein said change-over toothing means consists of one single tooth.

7. A toothing assembly as claimed in claim 1, wherein said gear, when engaging said change-over toothing means is arranged to leave the engagement with one of said toothed rack means immediately before it engages the other one of said toothed rack means.

8. A toothing assembly as claimed in claim 1, wherein said reference curves of said two toothed rack means are concave-arcuate.

* * * * *